United States Patent [19]

Stacey et al.

[11] Patent Number: 5,337,227
[45] Date of Patent: Aug. 9, 1994

[54] HARMONIC NEUTRALIZATION OF STATIC INVERTERS BY SUCCESSIVE STAGGER

[75] Inventors: Eric J. Stacey, Penn Hills Township, Allegheny County; John Rosa, Penn Hills, both of Pa.

[73] Assignee: Westinghouse Electric Corporation, Pittsburgh, Pa.

[21] Appl. No.: 870,128

[22] Filed: Apr. 15, 1992

[51] Int. Cl.⁵ .................................... H02M 1/12
[52] U.S. Cl. ................................ 363/71; 363/41; 363/43; 363/64; 307/105
[58] Field of Search ............... 363/5, 39, 40, 41, 43, 363/64, 71; 323/361; 307/105

[56] References Cited

U.S. PATENT DOCUMENTS

| | | |
|---|---|---|
| Re. 28,986 | 9/1976 | Heinrich et al. |
| 3,491,282 | 1/1970 | Heinrich et al. |
| 3,628,123 | 12/1971 | Rosa et al. |
| 3,792,286 | 2/1974 | Meier |
| 4,870,557 | 9/1989 | Stacey |
| 4,975,822 | 12/1990 | Lipman ........................ 363/40 |
| 5,040,105 | 8/1991 | Dhyanchand et al. ........ 363/43 |
| 5,041,957 | 8/1991 | Dhyanchand et al. ........ 363/43 |
| 5,041,958 | 8/1991 | Dhyanchand et al. ........ 363/43 |

*Primary Examiner*—Emanuel T. Voeltz

[57] ABSTRACT

Quasi-harmonic neutralized inverter systems are provided with interphase transformers connected in a waffle tree configuration and each having a pair of inputs for receiving staggered voltage waveforms, wherein the stagger angle of the voltage waveforms reduces a harmonic component of an output voltage on an output terminal of each interphase transformer. Inverters produce voltage waveforms at phase angles necessary to provide the required stagger angles at the inputs of the interphase transformers in a first stage of the waffle tree configuration. A method for quasi-harmonic neutralization of voltages in an inverter system is also provided, in which interphase transformers, each having a pair of inputs for receiving staggered voltage waveforms, are connected in a waffle tree configuration, such that the stagger angle of the voltage waveforms reduces a harmonic component of an output voltage on an output terminal of each interphase transformer. Voltage waveforms at phase angles necessary to provide the stagger angles are applied to the inputs of the interphase transformers in a first stage of the waffle tree configuration.

10 Claims, 10 Drawing Sheets

HARMONIC NEUTRALIZATION OF STATIC INVERTERS BY SUCCESSIVE STAGGER

BACKGROUND OF THE INVENTION

This invention relates to circuits and methods for harmonic neutralization of voltage waveforms in static inverters and, more particularly, to such circuits and methods which reduce or eliminate harmonic components from an output waveform by controlling the phase angle of various waveforms and combining such waveforms in a transformer circuit.

Static inverters employing switching devices are commonly used for many applications including DC/AC power conversion, variable speed drives, back-up power supplies and generation of controllable reactive power for utility transmission and distribution systems.

Presently, differences in the switching characteristics of semiconductor devices at various power levels, make it advantageous to employ different techniques to fabricate the voltage in low, medium and high power systems. For low power applications, very fast switching devices (such as MOSFETs) and construction techniques which minimize voltage spikes are practical. In low power systems, high frequency switching techniques and small filters are used to produce a high quality output voltage waveform. For medium power applications, lower switching frequencies and somewhat larger filters are usually employed. In medium power systems, devices generally switch somewhat slower and have well defined limits on the maximum di/dt and dv/dt that they can withstand. These devices therefore require di/dt and dv/dt limiting circuits and have a limit on their maximum switching frequency. For very high power systems, where the largest switching devices are required, presently available devices are only suitable for low frequency operation. In high power systems, it is common practice to employ special power circuit configurations which combine outputs of a number of stages each operating at the lowest possible frequency.

For very large systems where efficiency is important, and many switches are required to attain the power level, it is advantageous to operate the switches at fundamental frequency and employ harmonic neutralizing techniques to obtain a high quality output waveform. Classical harmonic neutralized inverters (HNIs), utilize multiple sets of phase displaced fundamental frequency square waves combined with special phase shifting transformers to realize high quality multi-step output waveforms. Each step of the output waveform is evenly spaced and has an amplitude proportional to the sine of its angular position. The number of steps is referred to as the pulse number.

In this type of multi-step inverter, each switching device operates with identical voltage and current waveforms and contributes equally to the output. Because all switches turn on and off at the same levels of current, all devices operate with similar delays and the effects of differences in current dependent switching delays upon the output waveforms are minimized. The harmonic spectrum of the synthesized output contains terms having harmonic $H_n$ orders of:

$$H_n = np \pm 1$$

and relative amplitude $A_n$:

$$A_n = 1/(np \pm 1)$$

where n is the pulse number and p is any integer. If a high quality waveform is desired, a high pulse number is clearly an advantage.

The basic building block of all of the relevant prior art systems is the six-pulse inverter bridge. A six-pulse bridge includes three inverter poles connected across a DC voltage source. Each pole has two switching devices connected in series, the junction of the switching devices being the AC output terminal. The inverter poles each operate at fundamental frequency and produce three square wave outputs with respect to the mid point of the DC voltage. The three outputs are symmetrically displaced by 120 degrees so that a pole transition occurs every 60 degrees or in other words, there are six state changes in a cycle of fundamental frequency.

The output voltages produced between the three AC terminals have true six pulse waveforms. The six-pulse bridge inverter forms the basic building block generally used to make up all higher pulse number harmonic neutralized inverters. To produce true harmonic neutralized outputs having pulse numbers of $N \times 6$, the outputs of N six-pulse bridges are combined as follows. The bridges are operated from a common DC source with their outputs incrementally phase displaced by an angle which corresponds to one segment of the desired multi-segment or multi-pulse output, that is, a displacement angle of 360/6N degrees. The fundamental outputs of individual six-pulse bridges are shifted into phase with each other by individual transformers having appropriate winding configurations and the same voltage ratios. The transformed outputs of each bridge, each having the same fundamental amplitude and phase, are combined either by the series connection of the secondaries, by parallel connection through appropriate interphase transformers, or by some combination of series and parallel connections.

To obtain the required phase shift between the primary and secondary of the transformer connected to each six-pulse bridge, different winding configurations are used on each transformer. While the improvement in waveform quality obtainable with higher pulse numbers is significant, the number of fractionally rated special transformers increases, and the cost cannot be justified for most applications. Therefore, simple transformers are preferred and 12-pulse configurations employing wye/wye and delta/wye windings are most common.

Techniques that combine the outputs of six-pulse bridge inverters to produce greatly improved "quasi harmonic neutralized inverter" (QHNI) outputs with less complicated transformer configurations are illustrated in U.S. Pat. No. 4,870,557, which is hereby incorporated by reference. A particularly advantageous configuration for a QHNI employs two transformers having open-wye/open-wye and open-wye/closed-delta windings fed from two pairs of six-pulse inverters. The first pair of inverters are operated at phase angles which lead the fundamental output by 7.5 degrees and 172.5 degrees. The second pair of inverters are operated at phase angles which lead the fundamental output by 37.5 and 202.5 degrees. The resultant fundamental voltages impressed across the primaries of the two transformers are phase displaced by 30 degrees so that the secondary voltages are in phase and add directly to produce a 24-pulse output.

To prevent zero sequence current form circulating in the delta winding of the second transformer, a zero sequence blocking transformer (ZSBT) having three identical windings on a single core, is connected in series with the open wye primary of the wye/delta transformer. Fundamental voltages produced at the secondaries are both in-phase at zero degrees and sum directly to form the resultant 24-pulse output. While the harmonic spectrum of the voltage waveform produced by this arrangement meets the requirements for many applications, for an advanced static VAR generator connected to high voltage transmission lines, it is desirable to reduce the amplitudes of the residual low order (11th and 13th) harmonics somewhat further.

SUMMARY OF THE INVENTION

This invention incorporates a technique employing successive staggers in the phase between individual pairs of inverters and between sets of partially harmonic neutralized inverters to provide harmonic neutralization or reduction of residual harmonics so that a higher quality waveform can be obtained without increasing the number of transformers or increasing the switching frequency. This technique is hereinafter referred to a "Successive Stagger Harmonic Neutralization" (SSHN).

Quasi-harmonic neutralized inverter systems constructed in accordance with this inventions include a plurality of interphase transformers each having first and second inputs for receiving staggered voltage waveforms, wherein a preselected stagger angle of the voltage waveforms reduces a predetermined harmonic component of an output voltage on an output terminal of each interphase transformer. The interphase transformers are connected in a waffle tree configuration. A plurality of inverters produce voltage waveforms at phase angles necessary to provide the preselected stagger angles of the voltage waveforms at the first and second inputs of the interphase transformers in a first stage of said waffle tree configuration.

The invention further encompasses a method for quasi-harmonic neutralization of voltages in an inverter system, including the steps of: connecting a plurality of interphase transformers, each having first and second inputs for receiving staggered voltage waveforms, in a waffle tree configuration wherein a preselected stagger angle of said voltage waveforms reduces a predetermined harmonic component of an output voltage on an output terminal of each interphase transformer; and using a plurality of inverters to produce voltage waveforms at phase angles necessary to provide the preselected stagger angles of the voltage waveforms at the first and second inputs of the interphase transformers in a first stage of the waffle tree configuration.

Intended primarily for high power applications, the technique disclosed here is one of several which can be used alone or in combination with the others to improve the quality of the output waveform, reduce cost and improve efficiency.

BRIEF DESCRIPTION OF THE DRAWINGS

The invention will become more readily apparent to those skilled in the art by reference to the following description of the preferred embodiments thereof as shown in the accompanying drawings wherein.

DESCRIPTION OF THE PREFERRED EMBODIMENT

Figure 1:
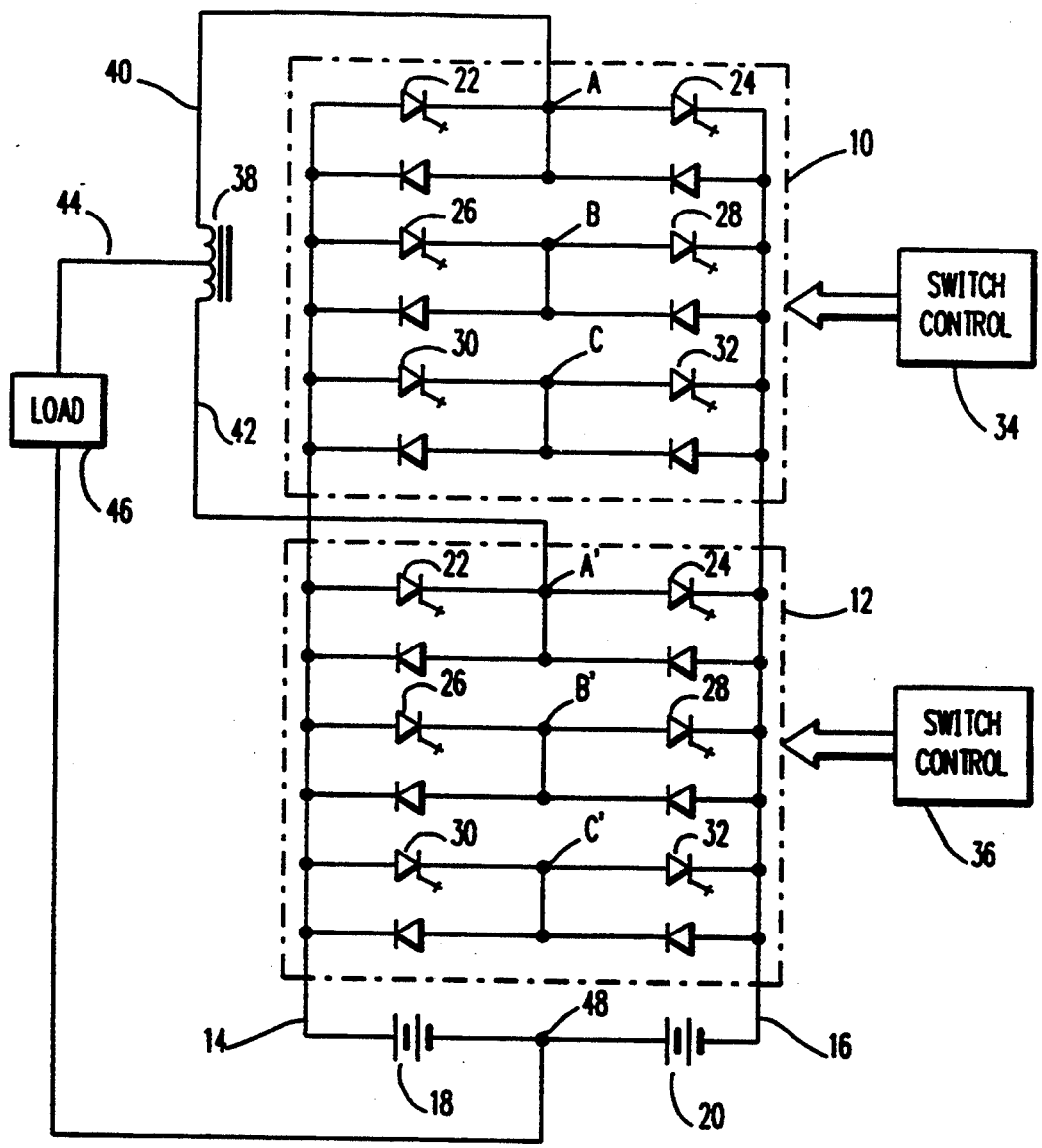
FIG. 1 is a schematic diagram, of a portion of a quasi harmonic neutralized inverter system which is used to illustrate the basic principles of the present invention.

Referring to the drawings, FIG. 1 is a schematic diagram of a portion of a quasi harmonic neutralized inverter system which is used to illustrate the basic principles of the present invention. A pair of six-pulse inverter bridge output circuits 10 and 12, are connected by way of DC conductors 14 and 16 to a DC power source schematically illustrated as a pair of batteries 18 and 20. Each of the bridge circuits includes six switching devices in the form of gate turn off thyristors 22, 24, 26, 28, 30 and 32. Each of switching devices is shunted by a diode. The operation of the switching devices is controlled by a bridge control circuits 34 and 36 in accordance with well known techniques. The switching devices are connected as shown to form power poles A, B and C in circuit 10 and A', B' and C' in circuit 12. A center tapped transformer 38, having inputs 40 and 42, and output 44 is connected between power poles A and A'. A load 46 is connected between the output of the interphase transformer and a neutral formed by the mid point 48 of the power source.

Figure 2:
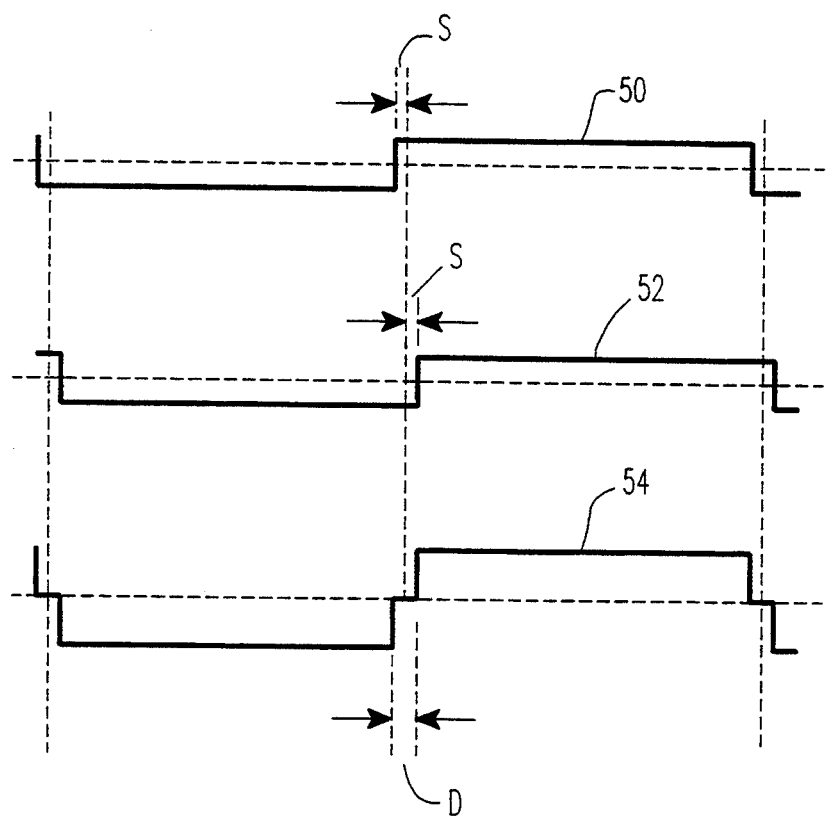
FIG. 2 is a waveform diagram which illustrates the operation of the circuit of FIG. 1.

In FIG. 1, if the two bridge circuits are operated to form in-phase square wave voltages at power poles A and A', the output voltage waveform at 44 will also be a square wave. If the phases of the two square wave voltages at the poles A and A' are displaced, the voltage at 44 is a quasi square wave having a value of zero for the duration of the displacement angle. If the phase of the fundamental output is to be kept fixed when the poles are displaced, it will be necessary to advance one and retard the other of the pole voltages so that they are symmetrically staggered about the phase of the fundamental voltage at the output of the interphase transformer. FIG. 2 shows a series of waveforms which illustrates the operation of the circuit of FIG. 1. Waveform 50 is a square wave voltage waveform such as might be produced at power pole A. Waveform 52 is a square wave voltage waveform such as might be produced at power pole A'. Waveform 54 is a quasi square wave voltage waveform which results from the application of waveforms 50 and 52 to the inputs of interphase transformer 38. Waveform 50 leads waveform 54 by a stagger angle S of 7.5 degrees. Waveform 52 lags waveform 54 by a stagger angle S of 7.5 degrees. As a result, waveform 54 is zero for a period equal to the displacement angle D of 15 degrees.

Figure 3:
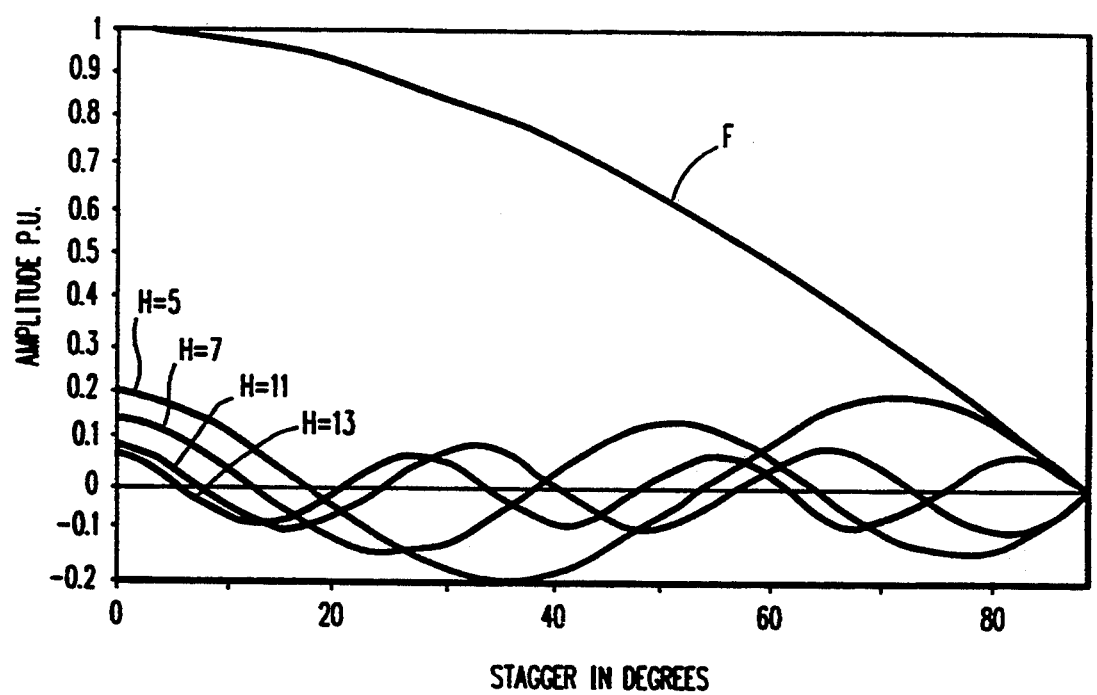
FIG. 3 is a graph of the harmonic amplitudes versus the stagger angle of the voltage waveforms of this invention.

The effect of the stagger is to reduce the fundamental and change the harmonics of the output voltage waveform. FIG. 3 is a graph showing the relationship between the stagger and the amplitude of the fundamental F, and the 5th, 7th, 11th and 13th harmonics H. It can be seen that the amplitude of each harmonic component passes through zero several times as the stagger changes from zero to 90 degrees. By selecting the appropriate stagger angle, any single (odd) harmonic may be eliminated, or a pair of harmonics may be significantly reduced. In order to have a minimum effect on the amplitude of the fundamental, it is preferable to select the minimum stagger. The minimum stagger in degrees, needed to neutralize a particular harmonic can be determined by dividing 90 by the harmonic order (n). To minimize the amplitude of a pair of harmonics having orders of (p±1) the approximate angle is 90/p degrees.

Figure 4:
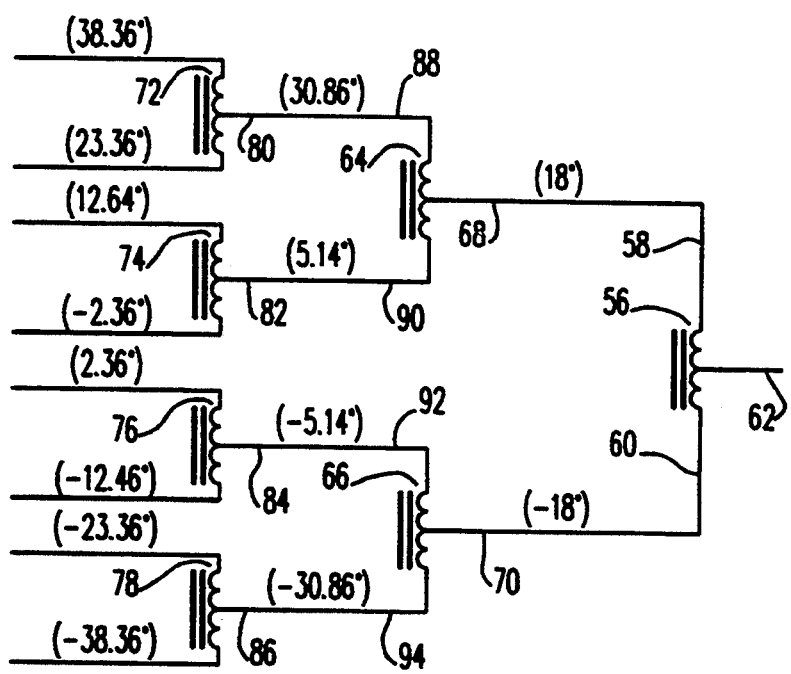
FIG. 4 is a schematic diagram of a waffle tree configuration of interphase transformers.

To eliminate more than one harmonic, successive staggers may be employed using a waffle tree configuration of interphase transformers (IPTs) shown in FIG. 4. For the purposes of this discussion, a waffle tree configuration includes an output interphase transformer having an output and two inputs, and one or more stages of interphase transformers connected to the output transformer. The interphase transformers in each stage include two inputs and an output, with each output being connected to an input of either the output interphase transformer or an interphase transformer in a succeeding stage. To minimize the number of staggers, each of which doubles the number of inverter stages, it is advantageous to use separate staggers to eliminate the individual dominant low order harmonics and to select staggers which attenuate pairs of higher order harmonics. In addition to the effect of the interphase transformers on the voltage waveforms, the IPTs also enforce current sharing between the inverter sets. Because large systems employing parallel paths would use current sharing reactors for this purpose, the additional of the IPTs will not complicate the design but will actually enhance its performance.

FIG. 4 shows a first interphase transformer 56 having inputs 58 and 60, and an output 62. This transformer forms the output stage of the waffle tree arrangement. A second stage of the waffle tree configuration includes center tapped interphase transformers 64 and 66, having output 68 and 70 respectively connected to the input of transformer 56. A third stage of the waffletree configuration includes center tapped interphase transformers 72, 74, 76 and 78. The outputs 80, 82, 84 and 86 of transformers 72, 74, 76 and 78 are connected to inputs 88, 90, 92 and 94 of transformers 64 and 66. The inputs of transformers 72, 74, 76 and 78 are connected to receive square wave voltage waveforms from corresponding power poles of eight inverters (not shown). The angles shown in parentheses in FIG. 4 represent the phase angles of the voltages on the corresponding lines with respect to the fundamental component of the output voltage on line 62.

The application of successive stagger harmonic neutralization is not limited to any particular inverter configuration or pole switching pattern. It can be usefully applied to reduce the harmonic content of any basic inverter arrangement. To illustrate its application, examples are set forth below to show how SSHN is applied to two basic inverter configurations.

Figure 5:
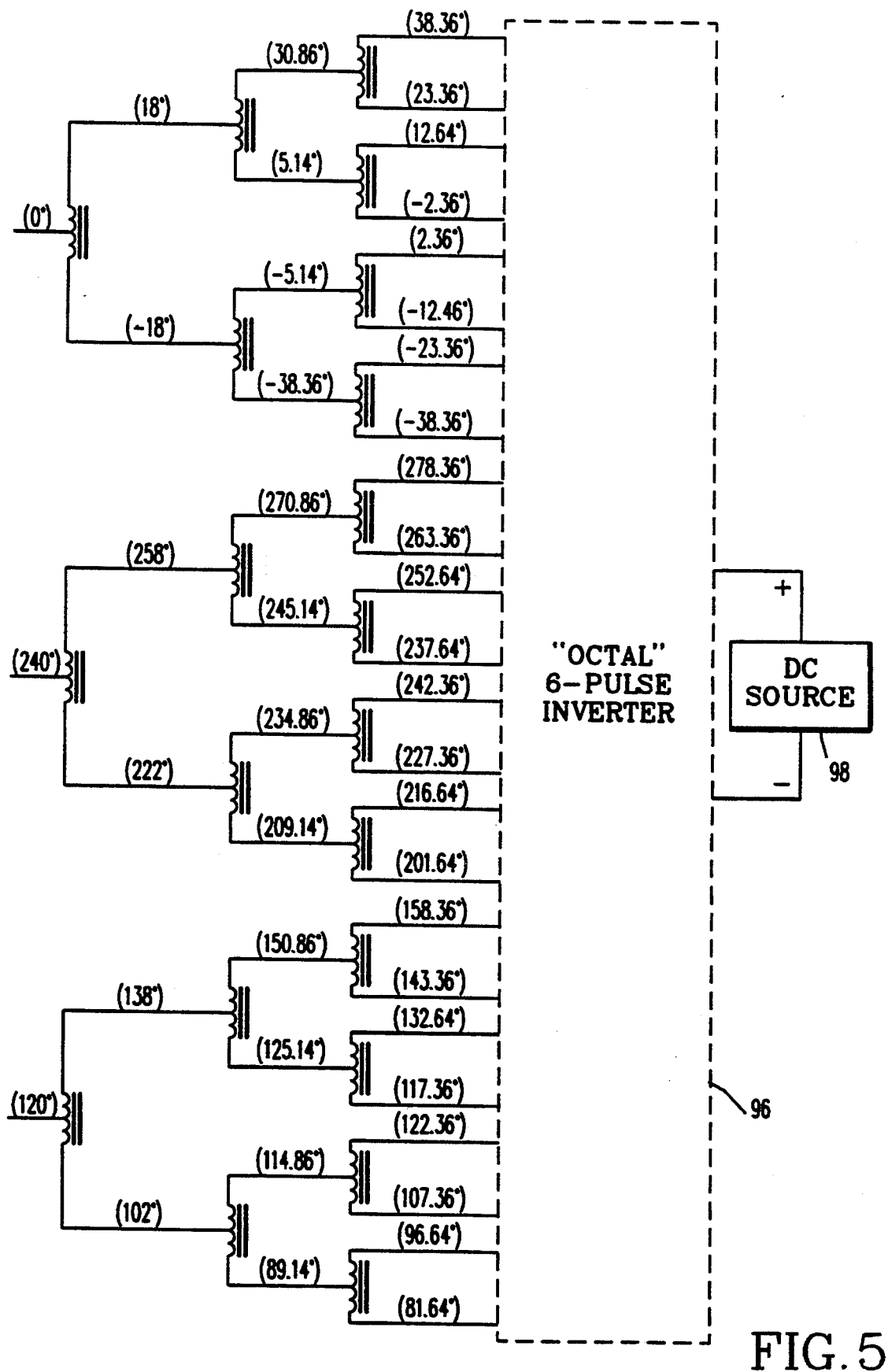
FIG. 5 is a schematic diagram of a successive stagger harmonic neutralized inverter system constructed in accordance with one embodiment of this invention.
Figure 6:
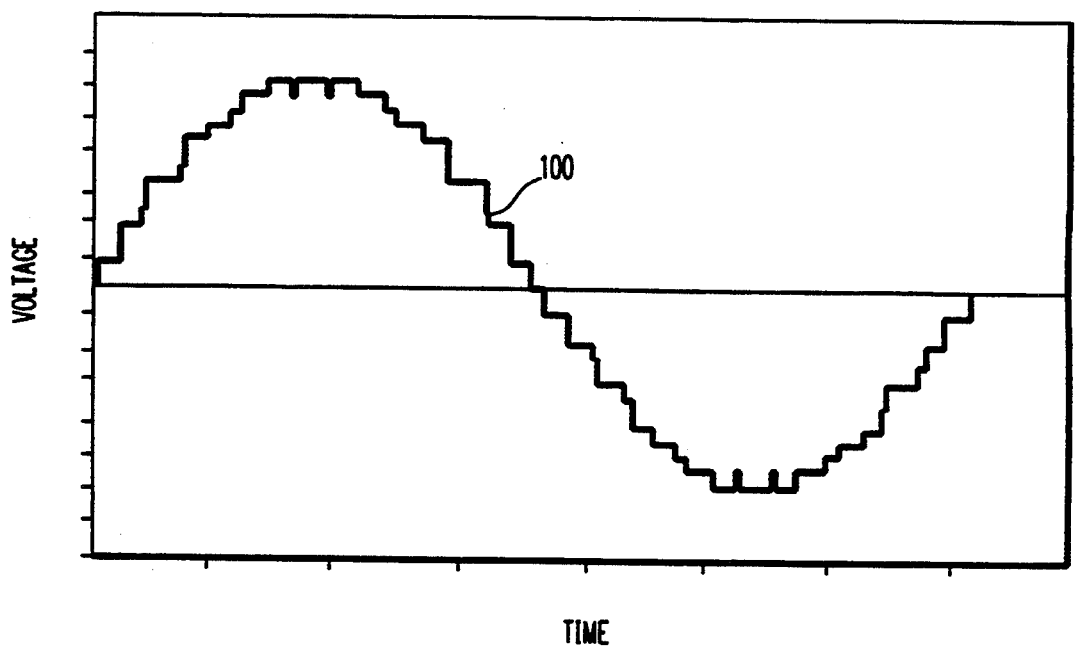
FIG. 6 is a graph of the output voltage waveform of the system of FIG. 5.
Figure 7:
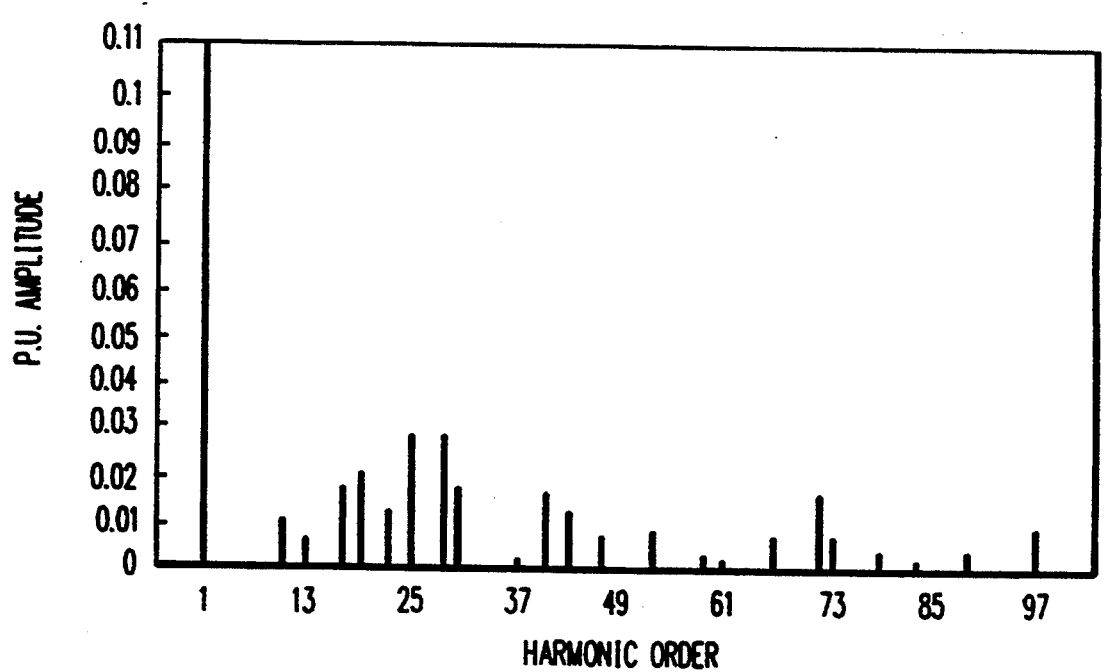
FIG. 7 is a chart of the harmonic spectrum of the output waveform to the circuit of FIG. 5.

FIG. 5 is a schematic diagram of an inverter system having eight six-pulse inverters, generally designated as block 96, which are powered by a DC power source 98. The eight six-pulse inverters are connected using a system of interphase transformers connected as shown in FIG. 4 to substantially neutralize all harmonics below the 17th. The resultant line to neutral voltage output waveform 100 for one phase of the system of FIG. 5, is shown in FIG. 6. FIG. 7 illustrates the harmonic spectrum of the output of the system of FIG. 5.

Figure 8:
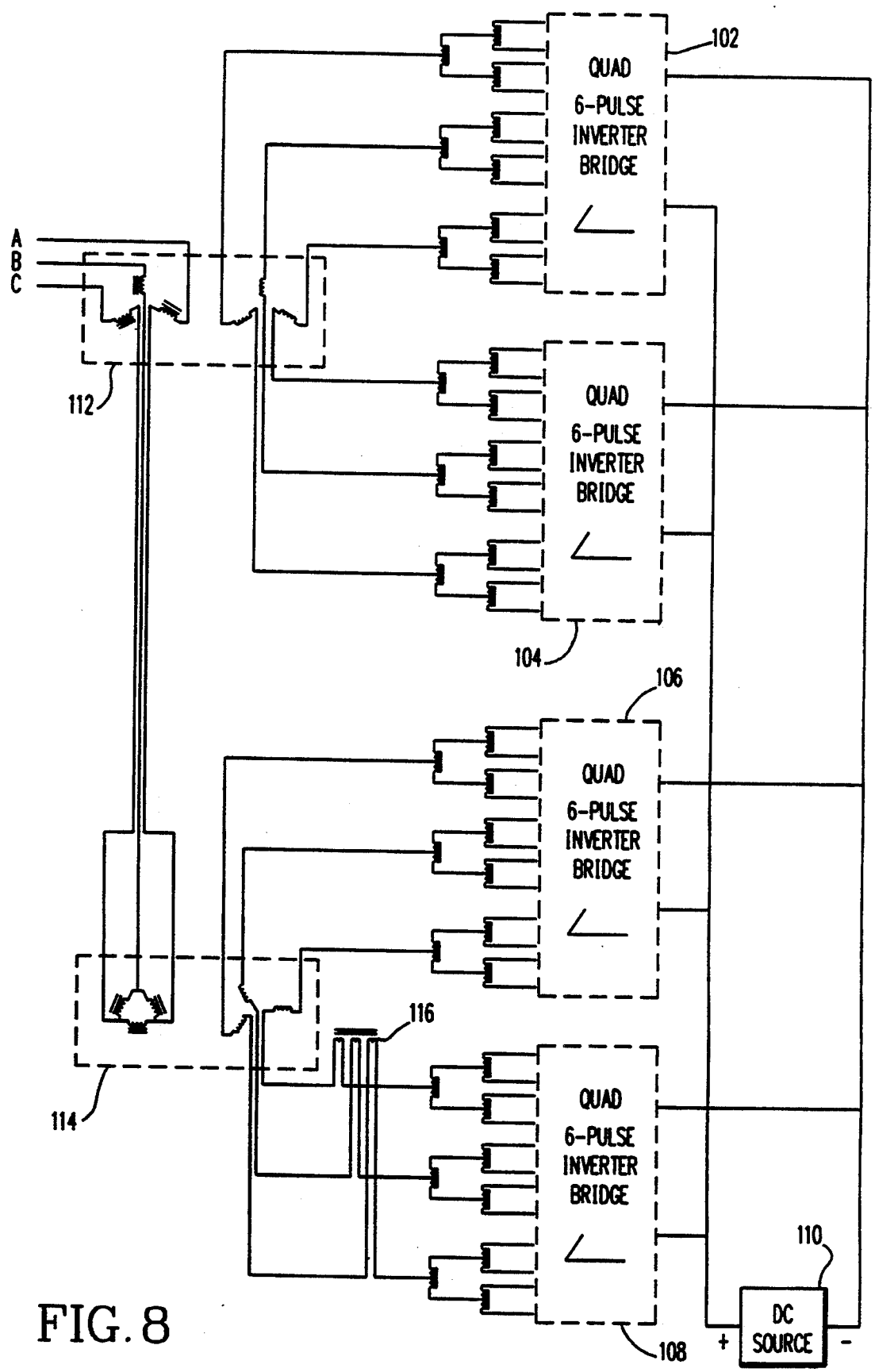
FIG. 8 is a schematic diagram of a successive stagger harmonic neutralized inverter system constructed in accordance with another embodiment of this invention.
Figure 9:
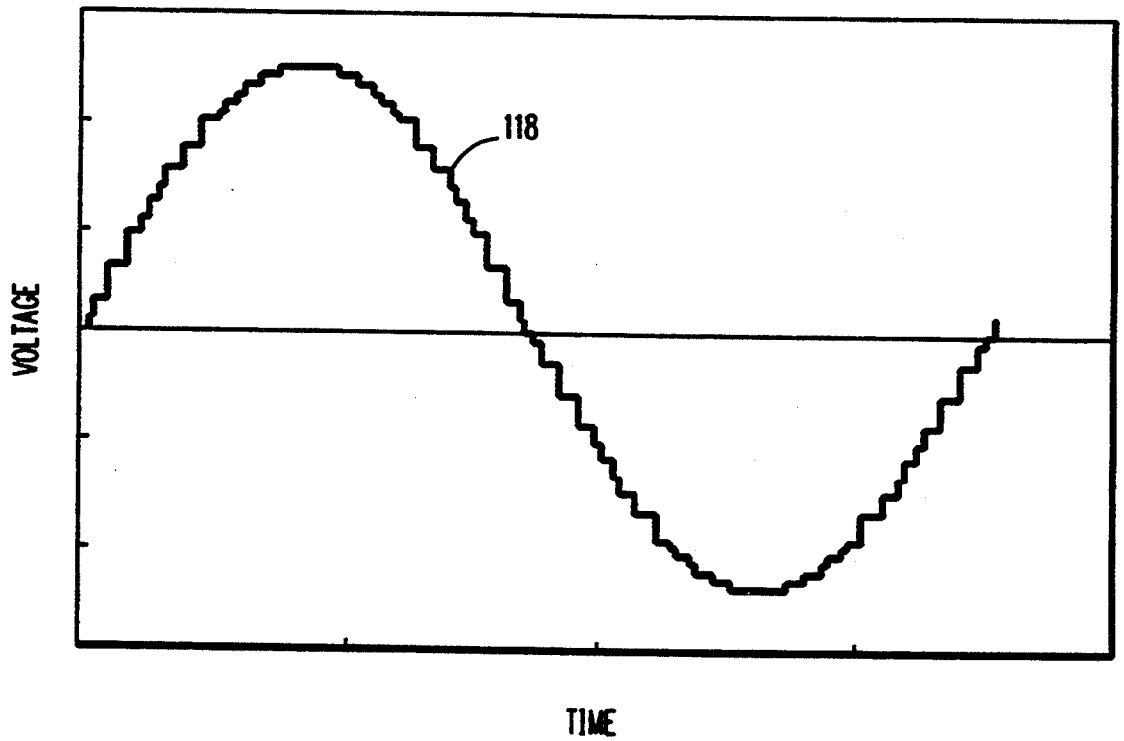
FIG. 9 is a graph of the output voltage waveform of the system of FIG. 8.
Figure 10:
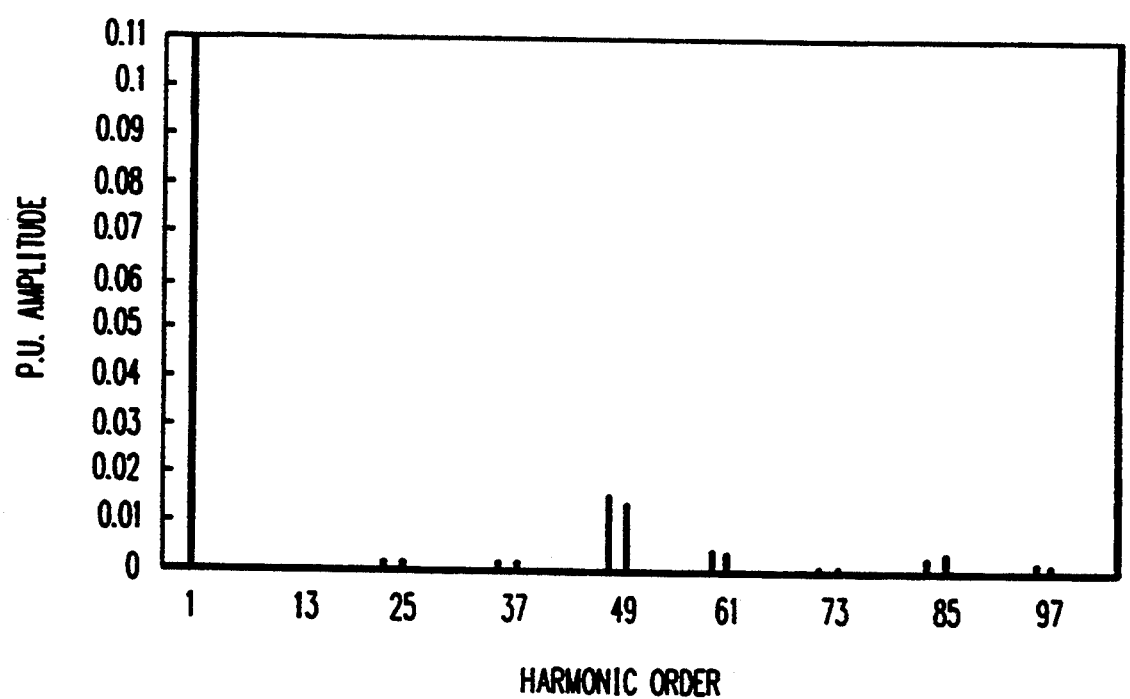
FIG. 10 is a chart of the harmonic spectrum of the output waveform to the circuit of FIG. 8.

FIG. 8 is a schematic diagram of an inverter system based on the 24-pulse QHNI configuration of U.S. Pat. No. 4,870,557. This system includes sixteen six-pulse inverters, arranged in groups of four and generally designated as blocks 102, 104, 106 and 108. All of the inverters are powered by a DC power source 110. The four inverters in each group are connected using a system of interphase transformers connected in two stages to provide two staggers. Outputs transformers 112 and 114 employing open wye/open wye and open wye/closed delta winding arrangements provide an additional stagger. A zero sequence blocking transformer 116 is used to block zero sequence circulating currents. The resultant line to neutral voltage output waveform 118 for one phase of the system of FIG. 8, is shown in FIG. 9. FIG. 10 illustrates the harmonic spectrum of the output of the system of FIG. 8.

In general, the volt second ratings of the IPTs needed for SSHN are largest when applied to a basic six-pulse configuration and are significantly lower for arrangements employing one or more transformers. For the modified six-pulse configuration shown in FIG. 5, the total equivalent rating of all IPTs is 0.252 P.U. For the modified quasi 24-pulse configuration shown in FIG. 8, the total equivalent rating of all IPTs is only 0.063 P.U.

The application of successive stagger harmonic neutralization techniques enables the dominant residual harmonics of an inverter output to be reduced or eliminated without changing the basic configuration or increasing the number of power transformers. For very large systems which in any case would require paralleling reactors, the reactors are replaced by appropriate IPTs, and the IPTs enforce current sharing and enable enhancement of the output waveform. Unlike some other techniques for reducing residual low order harmonics, such as notching of the inverter power pole waveforms, this technique does not increase the amplitudes of the remaining high order harmonics. Due to the absence of large high frequency harmonics, losses due to skin effect and eddy currents are minimized. When SSHN is used in conjunction with classical harmonic neutralizing techniques, the switching devices are operated at fundamental frequency, and the overall system efficiency will be superior to that of any other type of inverter.

Although the present invention has been described in terms of its preferred embodiment. It will be apparent to those skilled in the art that various changes may be made without departing from the scope of the invention. It is therefore intended that the appended claims cover such changes.

What is claimed is:

1. A quasi-harmonic neutralized inverter system comprising:
   a plurality of center tapped interphase transformers each having first and second inputs for receiving staggered voltage waveforms, wherein a preselected stagger angle of said voltage waveforms reduces a predetermined harmonic component of an output voltage on an output terminal of one of the interphase transformers;

said interphase transformers being connected in a waffle tree configuration; and a plurality of inverters for producing voltage waveforms at phase angles necessary to provide the preselected stagger angles of the voltage waveforms at the first and second inputs of the interphase transformers in a first stage of said waffle tree configuration.

2. A quasi-harmonic neutralized inverter system according to claim 1, wherein said voltage waveforms are square waves.

3. A quasi-harmonic neutralized inverter system according to claim 1, wherein said inverters are six-pulse inverters.

4. A quasi-harmonic neutralized inverter system comprising:

three output circuits, each including a plurality of center tapped interphase transformers connected in a waffle tree configuration, each of said interphase transformers having first and second inputs for receiving staggered voltage waveforms, wherein a preselected stagger angle of said voltage waveforms reduces a predetermined harmonic component of an output voltage on an output terminal of one of the interphase transformers; and a plurality of three phase inverters for producing voltage waveforms at phase angles necessary to provide the preselected stagger angles of the voltage waveforms at the first and second inputs of the interphase transformers in a first stage of each of said waffle tree configurations.

5. A quasi-harmonic neutralized inverter system according to claim 4, wherein said voltage waveforms are square waves.

6. A quasi-harmonic neutralized inverter system according to claim 4, wherein said inverters are six-pulse inverters.

7. A method for quasi-harmonic neutralization of voltages in an inverter system, said method comprising the steps of:

connecting a plurality of center tapped interphase transformers each having first and second inputs for receiving staggered voltage waveforms, in a waffle tree configuration, wherein a preselected stagger angle of said voltage waveforms reduces a predetermined harmonic component of an output voltage on an output terminal of the interphase transformer; and applying voltage waveforms at phase angles necessary to provide the preselected stagger angles of the voltage waveforms to the first and second inputs of the interphase transformers in a first stage of said waffle-tree configuration.

8. A quasi-harmonic neutralized inverter system comprising:

a first center tapped interphase transformer having first and second inputs for receiving first and second voltage waveforms, said first voltage waveform lagging a fundamental component of an output voltage waveform by a first preselected stagger angle and said second voltage waveform leading said fundamental component of said output voltage waveform by said first preselected stagger angle;

a second center tapped interphase transformer having first and second inputs for receiving third and fourth voltage waveforms, said third voltage waveform lagging said first voltage waveform by a second preselected stagger angle and said fourth voltage waveform leading said first voltage waveform by said second preselected stagger angle, said second interphase transformer having an output for producing said first voltage waveform and being connected to the first input of said first interphase transformer;

a third center tapped interphase transformer having first and second inputs for receiving fifth and sixth voltage waveforms, said fifth voltage waveform lagging said second voltage waveform by a third preselected stagger angle and said sixth voltage waveform leading said second voltage waveform by said third preselected stagger angle, said third interphase transformer having an output for producing said second voltage waveform and being connected to the second input of said first interphase transformer; and four inverters for producing said third, fourth, fifth and sixth voltage waveforms.

9. A quasi-harmonic neutralized inverter system according to claim 8, wherein said voltage waveforms are square waves.

10. A quasi-harmonic neutralized inverter system according to claim 8, wherein said inverters are six-pulse inverters.

* * * * *